US009843484B2

(12) United States Patent
Sankar et al.

(10) Patent No.: US 9,843,484 B2
(45) Date of Patent: Dec. 12, 2017

(54) GRACEFUL SCALING IN SOFTWARE DRIVEN NETWORKS

(71) Applicant: A10 Networks, Inc., San Jose, CA (US)

(72) Inventors: Swaminathan Sankar, San Jose, CA (US); Rahul Gupta, Fremont, CA (US); Gurudeep Kamat, San Jose, CA (US); Rajkumar Jalan, Saratoga, CA (US)

(73) Assignee: A10 NETWORKS, INC., San Jose, CA (US)

( * ) Notice: Subject to any disclaimer, the term of this patent is extended or adjusted under 35 U.S.C. 154(b) by 388 days.

(21) Appl. No.: 14/326,325

(22) Filed: Jul. 8, 2014

(65) Prior Publication Data
US 2016/0043901 A1 Feb. 11, 2016

Related U.S. Application Data

(63) Continuation-in-part of application No. 14/029,656, filed on Sep. 17, 2013.
(Continued)

(51) Int. Cl.
*H04L 12/24* (2006.01)
*H04L 29/08* (2006.01)

(52) U.S. Cl.
CPC .......... *H04L 41/12* (2013.01); *H04L 67/1031* (2013.01)

(58) Field of Classification Search
CPC .... H04L 41/12; H04L 47/125; H04L 67/1012
(Continued)

(56) References Cited

U.S. PATENT DOCUMENTS

| 5,218,602 | A | 6/1993 | Grant et al. |
| 5,774,660 | A | 6/1998 | Brendel et al. |

(Continued)

FOREIGN PATENT DOCUMENTS

| CN | 1372662 A | 10/2002 |
| CN | 1449618 | 10/2003 |

(Continued)

OTHER PUBLICATIONS

Gite, Vivek, "Linux Tune Network Stack (Buffers Size) to Increase Networking Performance," accessed Apr. 13, 2016 at URL: <<http://www.cyberciti.biz/faq/linux-tcp-tuning/>>, Jul. 8, 2009, 24 pages.

(Continued)

*Primary Examiner* — Nicholas Taylor
*Assistant Examiner* — Chong G Kim
(74) *Attorney, Agent, or Firm* — AMPACC Law Group, LLP; Keith Kline

(57) ABSTRACT

Provided are methods and systems for graceful scaling of data networks. In one example, an indication of removal of a node from a plurality of nodes of the data network is received. A service policy is generated to reassign service requests associated with the node to another node in the plurality of nodes. The service policy is then sent to each of the plurality of nodes of the data network. To scale out a data network, an indication of presence of a further node in the data network is received, and a further node service policy is generated and sent to each of the plurality of nodes of the data network and to the further node. Additional actions can be taken in order to prevent interruption of an existing heavy-duty connection while scaling the data network.

22 Claims, 9 Drawing Sheets

Related U.S. Application Data

(60) Provisional application No. 61/705,618, filed on Sep. 25, 2012.

(58) Field of Classification Search
USPC .......................................................... 709/224
See application file for complete search history.

(56) References Cited

U.S. PATENT DOCUMENTS

| | | |
|---|---|---|
| 5,935,207 A | 8/1999 | Logue et al. |
| 5,958,053 A | 9/1999 | Denker |
| 5,995,981 A | 11/1999 | Wikstrom |
| 6,003,069 A | 12/1999 | Cavill |
| 6,047,268 A | 4/2000 | Bartoli et al. |
| 6,131,163 A | 10/2000 | Wiegel |
| 6,219,706 B1 | 4/2001 | Fan et al. |
| 6,259,705 B1 | 7/2001 | Takahashi et al. |
| 6,321,338 B1 | 11/2001 | Porras et al. |
| 6,374,300 B2 | 4/2002 | Masters |
| 6,459,682 B1 | 10/2002 | Ellesson et al. |
| 6,587,866 B1 | 7/2003 | Modi et al. |
| 6,748,414 B1 | 6/2004 | Bournas |
| 6,772,334 B1 | 8/2004 | Glawitsch |
| 6,779,017 B1 | 8/2004 | Lamberton et al. |
| 6,779,033 B1 | 8/2004 | Watson et al. |
| 6,952,728 B1 | 10/2005 | Alles et al. |
| 7,010,605 B1 | 3/2006 | Dharmarajan |
| 7,013,482 B1 | 3/2006 | Krumel |
| 7,058,718 B2 | 6/2006 | Fontes et al. |
| 7,069,438 B2 | 6/2006 | Balabine et al. |
| 7,076,555 B1 | 7/2006 | Orman et al. |
| 7,143,087 B2 | 11/2006 | Fairweather |
| 7,167,927 B2 | 1/2007 | Philbrick et al. |
| 7,181,524 B1 | 2/2007 | Lele |
| 7,218,722 B1 | 5/2007 | Turner et al. |
| 7,228,359 B1 | 6/2007 | Monteiro |
| 7,234,161 B1 | 6/2007 | Maufer et al. |
| 7,236,457 B2 | 6/2007 | Joe |
| 7,254,133 B2 | 8/2007 | Govindarajan et al. |
| 7,269,850 B2 | 9/2007 | Govindarajan et al. |
| 7,277,963 B2 | 10/2007 | Dolson et al. |
| 7,301,899 B2 | 11/2007 | Goldstone |
| 7,308,499 B2 | 12/2007 | Chavez |
| 7,310,686 B2 | 12/2007 | Uysal |
| 7,328,267 B1 | 2/2008 | Bashyam et al. |
| 7,334,232 B2 | 2/2008 | Jacobs et al. |
| 7,337,241 B2 | 2/2008 | Boucher et al. |
| 7,343,399 B2 | 3/2008 | Hayball et al. |
| 7,349,970 B2 | 3/2008 | Clement et al. |
| 7,370,353 B2 | 5/2008 | Yang |
| 7,391,725 B2 | 6/2008 | Huitema et al. |
| 7,398,317 B2 | 7/2008 | Chen et al. |
| 7,423,977 B1 | 9/2008 | Joshi |
| 7,430,755 B1 | 9/2008 | Hughes et al. |
| 7,463,648 B1 | 12/2008 | Eppstein et al. |
| 7,467,202 B2 | 12/2008 | Savchuk |
| 7,472,190 B2 | 12/2008 | Robinson |
| 7,492,766 B2 | 2/2009 | Cabeca et al. |
| 7,506,360 B1 | 3/2009 | Wilkinson et al. |
| 7,509,369 B1 | 3/2009 | Tormasov |
| 7,512,980 B2 | 3/2009 | Copeland et al. |
| 7,533,409 B2 | 5/2009 | Keane et al. |
| 7,552,323 B2 | 6/2009 | Shay |
| 7,584,262 B1 | 9/2009 | Wang et al. |
| 7,584,301 B1 | 9/2009 | Joshi |
| 7,590,736 B2 | 9/2009 | Hydrie et al. |
| 7,613,193 B2 | 11/2009 | Swami et al. |
| 7,613,822 B2 | 11/2009 | Joy et al. |
| 7,673,072 B2 | 3/2010 | Boucher et al. |
| 7,675,854 B2 | 3/2010 | Chen et al. |
| 7,703,102 B1 | 4/2010 | Eppstein et al. |
| 7,707,295 B1 | 4/2010 | Szeto et al. |
| 7,711,790 B1 | 5/2010 | Barrett et al. |
| 7,739,395 B1 * | 6/2010 | Parlamas ............ H04L 65/1063 370/352 |
| 7,747,748 B2 | 6/2010 | Allen |
| 7,751,409 B1 * | 7/2010 | Carolan .............. H04L 41/5045 370/352 |
| 7,765,328 B2 | 7/2010 | Bryers et al. |
| 7,792,113 B1 | 9/2010 | Foschiano et al. |
| 7,808,994 B1 | 10/2010 | Vinokour et al. |
| 7,826,487 B1 | 11/2010 | Mukerji et al. |
| 7,881,215 B1 | 2/2011 | Daigle et al. |
| 7,948,952 B2 | 5/2011 | Hurtta et al. |
| 7,970,934 B1 | 6/2011 | Patel |
| 7,983,258 B1 | 7/2011 | Ruben et al. |
| 7,990,847 B1 | 8/2011 | Leroy et al. |
| 7,991,859 B1 | 8/2011 | Miller et al. |
| 8,019,870 B1 | 9/2011 | Eppstein et al. |
| 8,032,634 B1 | 10/2011 | Eppstein et al. |
| 8,090,866 B1 | 1/2012 | Bashyam et al. |
| 8,122,116 B2 | 2/2012 | Matsunaga et al. |
| 8,179,809 B1 | 5/2012 | Eppstein et al. |
| 8,185,651 B2 | 5/2012 | Moran et al. |
| 8,191,106 B2 | 5/2012 | Choyi et al. |
| 8,224,971 B1 | 7/2012 | Miller et al. |
| 8,266,235 B2 | 9/2012 | Jalan et al. |
| 8,296,434 B1 | 10/2012 | Miller et al. |
| 8,312,507 B2 | 11/2012 | Chen et al. |
| 8,379,515 B1 | 2/2013 | Mukerji |
| 8,499,093 B2 | 7/2013 | Grosser et al. |
| 8,539,075 B2 | 9/2013 | Bali et al. |
| 8,554,929 B1 | 10/2013 | Szeto et al. |
| 8,560,693 B1 | 10/2013 | Wang et al. |
| 8,584,199 B1 | 11/2013 | Chen et al. |
| 8,595,791 B1 | 11/2013 | Chen et al. |
| RE44,701 E | 1/2014 | Chen et al. |
| 8,675,488 B1 | 3/2014 | Sidebottom et al. |
| 8,681,610 B1 | 3/2014 | Mukerji |
| 8,750,164 B2 | 6/2014 | Casado et al. |
| 8,782,221 B2 | 7/2014 | Han |
| 8,813,180 B1 | 8/2014 | Chen et al. |
| 8,826,372 B1 | 9/2014 | Chen et al. |
| 8,879,427 B2 | 11/2014 | Krumel |
| 8,885,463 B1 | 11/2014 | Medved et al. |
| 8,897,154 B2 | 11/2014 | Jalan et al. |
| 8,965,957 B2 | 2/2015 | Barros |
| 8,977,749 B1 | 3/2015 | Han |
| 8,990,262 B2 | 3/2015 | Chen et al. |
| 9,094,364 B2 | 7/2015 | Jalan et al. |
| 9,106,561 B2 | 8/2015 | Jalan et al. |
| 9,154,577 B2 | 10/2015 | Jalan et al. |
| 9,154,584 B1 | 10/2015 | Han |
| 9,215,275 B2 | 12/2015 | Kannan et al. |
| 9,219,751 B1 | 12/2015 | Chen et al. |
| 9,253,152 B1 | 2/2016 | Chen et al. |
| 9,270,705 B1 | 2/2016 | Chen et al. |
| 9,270,774 B2 | 2/2016 | Jalan et al. |
| 9,338,225 B2 | 5/2016 | Jalan et al. |
| 9,350,744 B2 | 5/2016 | Chen et al. |
| 9,356,910 B2 | 5/2016 | Chen et al. |
| 2001/0049741 A1 | 12/2001 | Skene et al. |
| 2002/0032777 A1 | 3/2002 | Kawata et al. |
| 2002/0078164 A1 | 6/2002 | Reinschmidt |
| 2002/0091844 A1 | 7/2002 | Craft et al. |
| 2002/0103916 A1 | 8/2002 | Chen et al. |
| 2002/0133491 A1 | 9/2002 | Sim et al. |
| 2002/0138618 A1 | 9/2002 | Szabo |
| 2002/0143991 A1 | 10/2002 | Chow et al. |
| 2002/0178259 A1 | 11/2002 | Doyle et al. |
| 2002/0191575 A1 | 12/2002 | Kalavade et al. |
| 2002/0194335 A1 | 12/2002 | Maynard |
| 2002/0194350 A1 | 12/2002 | Lu et al. |
| 2003/0009591 A1 | 1/2003 | Hayball et al. |
| 2003/0014544 A1 | 1/2003 | Pettey |
| 2003/0023711 A1 | 1/2003 | Parmar et al. |
| 2003/0023873 A1 | 1/2003 | Ben-Itzhak |
| 2003/0035409 A1 | 2/2003 | Wang et al. |
| 2003/0035420 A1 | 2/2003 | Niu |
| 2003/0065762 A1 | 4/2003 | Stolorz et al. |
| 2003/0091028 A1 | 5/2003 | Chang et al. |
| 2003/0131245 A1 | 7/2003 | Linderman |
| 2003/0135625 A1 | 7/2003 | Fontes et al. |
| 2003/0195962 A1 | 10/2003 | Kikuchi et al. |

(56) References Cited

U.S. PATENT DOCUMENTS

| | | |
|---|---|---|
| 2004/0062246 A1 | 4/2004 | Boucher et al. |
| 2004/0073703 A1 | 4/2004 | Boucher et al. |
| 2004/0078419 A1 | 4/2004 | Ferrari et al. |
| 2004/0078480 A1 | 4/2004 | Boucher et al. |
| 2004/0111516 A1 | 6/2004 | Cain |
| 2004/0128312 A1 | 7/2004 | Shalabi et al. |
| 2004/0139057 A1 | 7/2004 | Hirata et al. |
| 2004/0139108 A1 | 7/2004 | Tang et al. |
| 2004/0141005 A1 | 7/2004 | Banatwala et al. |
| 2004/0143599 A1 | 7/2004 | Shalabi et al. |
| 2004/0187032 A1 | 9/2004 | Gels et al. |
| 2004/0199616 A1 | 10/2004 | Karhu |
| 2004/0199646 A1 | 10/2004 | Susai et al. |
| 2004/0202182 A1 | 10/2004 | Lund et al. |
| 2004/0210623 A1 | 10/2004 | Hydrie et al. |
| 2004/0210663 A1 | 10/2004 | Phillips et al. |
| 2004/0213158 A1 | 10/2004 | Collett et al. |
| 2004/0268358 A1 | 12/2004 | Darling et al. |
| 2005/0005207 A1 | 1/2005 | Herneque |
| 2005/0009520 A1 | 1/2005 | Herrero et al. |
| 2005/0021848 A1 | 1/2005 | Jorgenson |
| 2005/0027862 A1 | 2/2005 | Nguyen et al. |
| 2005/0036501 A1 | 2/2005 | Chung et al. |
| 2005/0036511 A1 | 2/2005 | Baratakke et al. |
| 2005/0044270 A1 | 2/2005 | Grove et al. |
| 2005/0074013 A1 | 4/2005 | Hershey et al. |
| 2005/0080890 A1 | 4/2005 | Yang et al. |
| 2005/0102400 A1 | 5/2005 | Nakahara et al. |
| 2005/0125276 A1 | 6/2005 | Rusu |
| 2005/0163073 A1 | 7/2005 | Heller et al. |
| 2005/0198335 A1 | 9/2005 | Brown et al. |
| 2005/0213586 A1 | 9/2005 | Cyganski et al. |
| 2005/0240989 A1 | 10/2005 | Kim et al. |
| 2005/0249225 A1 | 11/2005 | Singhal |
| 2005/0259586 A1 | 11/2005 | Hafid et al. |
| 2005/0289231 A1 | 12/2005 | Harada et al. |
| 2006/0023721 A1 | 2/2006 | Miyake et al. |
| 2006/0036610 A1 | 2/2006 | Wang |
| 2006/0036733 A1 | 2/2006 | Fujimoto et al. |
| 2006/0064478 A1 | 3/2006 | Sirkin |
| 2006/0069774 A1 | 3/2006 | Chen et al. |
| 2006/0069804 A1 | 3/2006 | Miyake et al. |
| 2006/0077926 A1 | 4/2006 | Rune |
| 2006/0092950 A1 | 5/2006 | Arregoces et al. |
| 2006/0098645 A1 | 5/2006 | Walkin |
| 2006/0112170 A1 | 5/2006 | Sirkin |
| 2006/0168319 A1 | 7/2006 | Trossen |
| 2006/0187901 A1 | 8/2006 | Cortes et al. |
| 2006/0190997 A1 | 8/2006 | Mahajani et al. |
| 2006/0209789 A1 | 9/2006 | Gupta et al. |
| 2006/0230129 A1 | 10/2006 | Swami et al. |
| 2006/0233100 A1 | 10/2006 | Luft et al. |
| 2006/0251057 A1 | 11/2006 | Kwon et al. |
| 2006/0277303 A1 | 12/2006 | Hegde et al. |
| 2006/0280121 A1 | 12/2006 | Matoba |
| 2007/0019543 A1 | 1/2007 | Wei et al. |
| 2007/0086382 A1 | 4/2007 | Narayanan et al. |
| 2007/0094396 A1 | 4/2007 | Takano et al. |
| 2007/0118881 A1 | 5/2007 | Mitchell et al. |
| 2007/0156919 A1 | 7/2007 | Potti et al. |
| 2007/0165622 A1 | 7/2007 | O'Rourke et al. |
| 2007/0185998 A1 | 8/2007 | Touitou et al. |
| 2007/0195792 A1 | 8/2007 | Chen et al. |
| 2007/0230337 A1 | 10/2007 | Igarashi et al. |
| 2007/0245090 A1 | 10/2007 | King et al. |
| 2007/0259673 A1 | 11/2007 | Willars et al. |
| 2007/0283429 A1 | 12/2007 | Chen et al. |
| 2007/0286077 A1 | 12/2007 | Wu |
| 2007/0288247 A1 | 12/2007 | Mackay |
| 2007/0294209 A1 | 12/2007 | Strub et al. |
| 2008/0031263 A1 | 2/2008 | Ervin et al. |
| 2008/0101396 A1 | 5/2008 | Miyata |
| 2008/0109452 A1 | 5/2008 | Patterson |
| 2008/0109870 A1 | 5/2008 | Sherlock et al. |
| 2008/0134332 A1 | 6/2008 | Keohane et al. |
| 2008/0162679 A1 | 7/2008 | Maher et al. |
| 2008/0228781 A1 | 9/2008 | Chen et al. |
| 2008/0250099 A1 | 10/2008 | Shen et al. |
| 2008/0263209 A1 | 10/2008 | Pisharody et al. |
| 2008/0271130 A1 | 10/2008 | Ramamoorthy |
| 2008/0282254 A1 | 11/2008 | Blander et al. |
| 2008/0291911 A1 | 11/2008 | Lee et al. |
| 2009/0049198 A1 | 2/2009 | Blinn et al. |
| 2009/0070470 A1 | 3/2009 | Bauman et al. |
| 2009/0077651 A1 | 3/2009 | Poeluev |
| 2009/0092124 A1 | 4/2009 | Singhal et al. |
| 2009/0106830 A1 | 4/2009 | Maher |
| 2009/0138606 A1 | 5/2009 | Moran et al. |
| 2009/0138945 A1 | 5/2009 | Savchuk |
| 2009/0141634 A1 | 6/2009 | Rothstein et al. |
| 2009/0164614 A1 | 6/2009 | Christian et al. |
| 2009/0172093 A1 | 7/2009 | Matsubara |
| 2009/0213858 A1 | 8/2009 | Dolganow et al. |
| 2009/0222583 A1 | 9/2009 | Josefsberg et al. |
| 2009/0227228 A1 | 9/2009 | Hu et al. |
| 2009/0228547 A1 | 9/2009 | Miyaoka et al. |
| 2009/0262741 A1 | 10/2009 | Jungck et al. |
| 2009/0271472 A1 | 10/2009 | Scheifler et al. |
| 2009/0313379 A1 | 12/2009 | Rydnell et al. |
| 2010/0004004 A1* | 1/2010 | Browne-Swinburne H04W 4/02 455/457 |
| 2010/0008229 A1 | 1/2010 | Bi et al. |
| 2010/0023621 A1 | 1/2010 | Ezolt et al. |
| 2010/0036952 A1 | 2/2010 | Hazlewood et al. |
| 2010/0054139 A1 | 3/2010 | Chun et al. |
| 2010/0061319 A1 | 3/2010 | Aso et al. |
| 2010/0064008 A1 | 3/2010 | Yan et al. |
| 2010/0082787 A1 | 4/2010 | Kommula et al. |
| 2010/0083076 A1 | 4/2010 | Ushiyama |
| 2010/0094985 A1 | 4/2010 | Abu-Samaha et al. |
| 2010/0098417 A1 | 4/2010 | Tse-Au |
| 2010/0106833 A1 | 4/2010 | Banerjee et al. |
| 2010/0106854 A1 | 4/2010 | Kim et al. |
| 2010/0128606 A1 | 5/2010 | Patel et al. |
| 2010/0162378 A1 | 6/2010 | Jayawardena et al. |
| 2010/0210265 A1 | 8/2010 | Borzsei et al. |
| 2010/0217793 A1 | 8/2010 | Preiss |
| 2010/0217819 A1 | 8/2010 | Chen et al. |
| 2010/0223630 A1 | 9/2010 | Degenkolb et al. |
| 2010/0228819 A1 | 9/2010 | Wei |
| 2010/0228878 A1 | 9/2010 | Xu et al. |
| 2010/0235507 A1 | 9/2010 | Szeto et al. |
| 2010/0235522 A1 | 9/2010 | Chen et al. |
| 2010/0235880 A1 | 9/2010 | Chen et al. |
| 2010/0238828 A1 | 9/2010 | Russell |
| 2010/0265824 A1 | 10/2010 | Chao et al. |
| 2010/0268814 A1 | 10/2010 | Cross et al. |
| 2010/0293296 A1 | 11/2010 | Hsu et al. |
| 2010/0312740 A1 | 12/2010 | Clemm et al. |
| 2010/0318631 A1 | 12/2010 | Shukla |
| 2010/0322252 A1 | 12/2010 | Suganthi et al. |
| 2010/0330971 A1 | 12/2010 | Selitser et al. |
| 2010/0333101 A1 | 12/2010 | Pope et al. |
| 2011/0007652 A1 | 1/2011 | Bai |
| 2011/0019550 A1* | 1/2011 | Bryers .................. H04L 29/06 370/235 |
| 2011/0023071 A1 | 1/2011 | Li et al. |
| 2011/0029599 A1 | 2/2011 | Pulleyn et al. |
| 2011/0032941 A1 | 2/2011 | Quach et al. |
| 2011/0040826 A1 | 2/2011 | Chadzelek et al. |
| 2011/0047294 A1* | 2/2011 | Singh .................. H04L 63/0263 709/246 |
| 2011/0060831 A1 | 3/2011 | Ishii et al. |
| 2011/0060840 A1 | 3/2011 | Susai et al. |
| 2011/0093522 A1 | 4/2011 | Chen et al. |
| 2011/0099403 A1 | 4/2011 | Miyata et al. |
| 2011/0110294 A1 | 5/2011 | Valluri et al. |
| 2011/0145324 A1 | 6/2011 | Reinart et al. |
| 2011/0153834 A1 | 6/2011 | Bharrat |
| 2011/0178985 A1 | 7/2011 | San Martin Arribas et al. |
| 2011/0185073 A1 | 7/2011 | Jagadeeswaran et al. |
| 2011/0191773 A1 | 8/2011 | Pavel et al. |
| 2011/0196971 A1 | 8/2011 | Reguraman et al. |

(56) References Cited

U.S. PATENT DOCUMENTS

| | | | |
|---|---|---|---|
| 2011/0226810 A1* | 9/2011 | Wang | B05B 11/0027 222/129 |
| 2011/0276695 A1 | 11/2011 | Maldaner | |
| 2011/0276982 A1 | 11/2011 | Nakayama et al. | |
| 2011/0289496 A1 | 11/2011 | Steer | |
| 2011/0292939 A1 | 12/2011 | Subramaian et al. | |
| 2011/0302256 A1 | 12/2011 | Sureshehandra et al. | |
| 2011/0307541 A1 | 12/2011 | Walsh et al. | |
| 2012/0008495 A1 | 1/2012 | Shen et al. | |
| 2012/0023231 A1 | 1/2012 | Ueno | |
| 2012/0026897 A1 | 2/2012 | Guichard et al. | |
| 2012/0030341 A1 | 2/2012 | Jensen et al. | |
| 2012/0066371 A1 | 3/2012 | Patel et al. | |
| 2012/0084419 A1 | 4/2012 | Kannan et al. | |
| 2012/0084460 A1 | 4/2012 | McGinnity et al. | |
| 2012/0106355 A1 | 5/2012 | Ludwig | |
| 2012/0117571 A1 | 5/2012 | Davis et al. | |
| 2012/0144014 A1 | 6/2012 | Natham et al. | |
| 2012/0144015 A1 | 6/2012 | Jalan et al. | |
| 2012/0151353 A1 | 6/2012 | Joanny | |
| 2012/0170548 A1 | 7/2012 | Rajagopalan et al. | |
| 2012/0173759 A1 | 7/2012 | Agarwal et al. | |
| 2012/0179770 A1 | 7/2012 | Jalan et al. | |
| 2012/0191839 A1 | 7/2012 | Maynard | |
| 2012/0239792 A1 | 9/2012 | Banerjee et al. | |
| 2012/0240185 A1 | 9/2012 | Kapoor et al. | |
| 2012/0290727 A1 | 11/2012 | Tivig | |
| 2012/0297046 A1 | 11/2012 | Raja et al. | |
| 2012/0311116 A1 | 12/2012 | Jalan et al. | |
| 2013/0046876 A1 | 2/2013 | Narayana et al. | |
| 2013/0058335 A1 | 3/2013 | Koponen et al. | |
| 2013/0074177 A1 | 3/2013 | Varadhan et al. | |
| 2013/0083725 A1 | 4/2013 | Mallya et al. | |
| 2013/0100958 A1 | 4/2013 | Jalan et al. | |
| 2013/0103817 A1* | 4/2013 | Koponen | G06F 9/45558 709/223 |
| 2013/0124713 A1 | 5/2013 | Feinberg et al. | |
| 2013/0136139 A1 | 5/2013 | Zheng et al. | |
| 2013/0148500 A1 | 6/2013 | Sonoda et al. | |
| 2013/0166762 A1 | 6/2013 | Jalan et al. | |
| 2013/0173795 A1 | 7/2013 | McPherson | |
| 2013/0176854 A1 | 7/2013 | Chisu et al. | |
| 2013/0191486 A1 | 7/2013 | Someya et al. | |
| 2013/0198385 A1 | 8/2013 | Han et al. | |
| 2013/0250765 A1 | 9/2013 | Ehsan et al. | |
| 2013/0250770 A1 | 9/2013 | Zou et al. | |
| 2013/0258846 A1 | 10/2013 | Damola | |
| 2013/0268646 A1* | 10/2013 | Doron | H04L 67/1023 709/223 |
| 2013/0282791 A1 | 10/2013 | Kruglick | |
| 2013/0336159 A1* | 12/2013 | Previdi | H04L 45/50 370/254 |
| 2014/0012972 A1 | 1/2014 | Han | |
| 2014/0089500 A1 | 3/2014 | Sankar et al. | |
| 2014/0164617 A1 | 6/2014 | Jalan et al. | |
| 2014/0169168 A1 | 6/2014 | Jalan et al. | |
| 2014/0207845 A1 | 7/2014 | Han et al. | |
| 2014/0226658 A1 | 8/2014 | Kakadia et al. | |
| 2014/0235249 A1 | 8/2014 | Jeong et al. | |
| 2014/0248914 A1 | 9/2014 | Aoyagi et al. | |
| 2014/0258465 A1 | 9/2014 | Li | |
| 2014/0258536 A1 | 9/2014 | Chiong | |
| 2014/0269728 A1 | 9/2014 | Jalan et al. | |
| 2014/0286313 A1 | 9/2014 | Fu et al. | |
| 2014/0298091 A1 | 10/2014 | Carlen et al. | |
| 2014/0325649 A1* | 10/2014 | Zhang | H04L 43/024 726/23 |
| 2014/0330982 A1 | 11/2014 | Jalan et al. | |
| 2014/0334485 A1 | 11/2014 | Jain et al. | |
| 2014/0359052 A1 | 12/2014 | Joachimpillai et al. | |
| 2015/0039671 A1 | 2/2015 | Jalan et al. | |
| 2015/0098333 A1 | 4/2015 | Lin et al. | |
| 2015/0156223 A1 | 6/2015 | Xu et al. | |
| 2015/0215436 A1 | 7/2015 | Kancherla | |
| 2015/0237173 A1 | 8/2015 | Virkki et al. | |
| 2015/0281087 A1 | 10/2015 | Jalan et al. | |
| 2015/0281104 A1 | 10/2015 | Golshan et al. | |
| 2015/0296058 A1 | 10/2015 | Jalan et al. | |
| 2015/0312268 A1 | 10/2015 | Ray | |
| 2015/0333988 A1 | 11/2015 | Jalan et al. | |
| 2015/0350048 A1 | 12/2015 | Sampat et al. | |
| 2015/0350379 A1 | 12/2015 | Jalan et al. | |
| 2016/0014052 A1 | 1/2016 | Han | |
| 2016/0036778 A1 | 2/2016 | Chen et al. | |
| 2016/0042014 A1 | 2/2016 | Jalan et al. | |
| 2016/0044095 A1 | 2/2016 | Sankar et al. | |
| 2016/0050233 A1 | 2/2016 | Chen et al. | |
| 2016/0088074 A1 | 3/2016 | Kannan et al. | |
| 2016/0094470 A1 | 3/2016 | Skog | |
| 2016/0105395 A1 | 4/2016 | Chen et al. | |
| 2016/0105446 A1 | 4/2016 | Chen et al. | |
| 2016/0119382 A1 | 4/2016 | Chen et al. | |
| 2016/0156708 A1 | 6/2016 | Jalan et al. | |
| 2016/0164792 A1 | 6/2016 | Oran | |
| 2016/0173579 A1 | 6/2016 | Jalan et al. | |

FOREIGN PATENT DOCUMENTS

| | | |
|---|---|---|
| CN | 1473300 A | 2/2004 |
| CN | 1529460 | 9/2004 |
| CN | 1575582 | 2/2005 |
| CN | 1714545 A | 12/2005 |
| CN | 1725702 | 1/2006 |
| CN | 1910869 A | 2/2007 |
| CN | 101004740 A | 7/2007 |
| CN | 101094225 | 12/2007 |
| CN | 101163336 A | 4/2008 |
| CN | 101169785 A | 4/2008 |
| CN | 101189598 | 5/2008 |
| CN | 101193089 A | 6/2008 |
| CN | 101247349 A | 8/2008 |
| CN | 101261644 A | 9/2008 |
| CN | 101495993 A | 7/2009 |
| CN | 101878663 A | 11/2010 |
| CN | 102143075 A | 8/2011 |
| CN | 102546590 | 7/2012 |
| CN | 102571742 | 7/2012 |
| CN | 102577252 | 7/2012 |
| CN | 102918801 | 2/2013 |
| CN | 103533018 A | 1/2014 |
| CN | 103944954 | 7/2014 |
| CN | 104040990 | 9/2014 |
| CN | 104067569 | 9/2014 |
| CN | 104106241 | 10/2014 |
| CN | 104137491 | 11/2014 |
| CN | 104796396 A | 7/2015 |
| CN | 102577252 B | 3/2016 |
| CN | 102918801 B | 5/2016 |
| CN | 102571742 B | 7/2016 |
| CN | 104067569 B | 2/2017 |
| EP | 1209876 | 5/2002 |
| EP | 1770915 | 4/2007 |
| EP | 1885096 | 2/2008 |
| EP | 02296313 | 3/2011 |
| EP | 2577910 | 4/2013 |
| EP | 2622795 | 8/2013 |
| EP | 2647174 | 10/2013 |
| EP | 2760170 | 7/2014 |
| EP | 2772026 | 9/2014 |
| EP | 2901308 A2 | 8/2015 |
| EP | 2760170 B1 | 12/2015 |
| EP | 2772026 B1 | 2/2017 |
| HK | 1182560 | 11/2013 |
| HK | 1183569 A | 12/2013 |
| HK | 1183996 A | 1/2014 |
| HK | 1189438 | 6/2014 |
| HK | 1198565 A1 | 5/2015 |
| HK | 1198848 A1 | 6/2015 |
| HK | 1199153 A1 | 6/2015 |
| HK | 1199779 A1 | 7/2015 |
| HK | 1200617 A | 8/2015 |
| IN | 1668CHENP2015 A | 7/2016 |
| JP | H09-097233 | 4/1997 |

(56) References Cited

FOREIGN PATENT DOCUMENTS

| | | |
|---|---|---|
| JP | 1999096128 | 4/1999 |
| JP | H11-338836 | 10/1999 |
| JP | 2000276432 A | 10/2000 |
| JP | 2000307634 A | 11/2000 |
| JP | 2001051859 A | 2/2001 |
| JP | 2001298449 A | 10/2001 |
| JP | 2002091936 A | 3/2002 |
| JP | 2003141068 A | 5/2003 |
| JP | 2003186776 A | 7/2003 |
| JP | 2005141441 A | 6/2005 |
| JP | 2006332825 A | 12/2006 |
| JP | 2008040718 A | 2/2008 |
| JP | 2009500731 A | 1/2009 |
| JP | 2013528330 | 5/2011 |
| JP | 2014504484 A | 2/2014 |
| JP | 2014143686 | 8/2014 |
| JP | 2015507380 A | 3/2015 |
| JP | 5855663 B2 | 12/2015 |
| JP | 5906263 B | 3/2016 |
| JP | 5913609 B2 | 4/2016 |
| JP | 5963766 B2 | 8/2016 |
| KR | 1020080008340 A | 1/2008 |
| KR | 10-0830413 | 5/2008 |
| KR | 1020120117461 | 8/2013 |
| KR | 101576585 B1 | 12/2015 |
| KR | 101632187 B1 | 6/2016 |
| KR | 101692751 B1 | 1/2017 |
| WO | 01/13228 | 2/2001 |
| WO | 0114990 | 3/2001 |
| WO | WO0145349 | 6/2001 |
| WO | 2003103237 | 12/2003 |
| WO | WO2004084085 A1 | 9/2004 |
| WO | WO2006098033 A1 | 9/2006 |
| WO | 2008053954 | 5/2008 |
| WO | WO2008078593 A1 | 7/2008 |
| WO | 2011049770 | 4/2011 |
| WO | WO2011079381 A1 | 7/2011 |
| WO | 2011149796 | 12/2011 |
| WO | 2012050747 | 4/2012 |
| WO | 2012075237 | 6/2012 |
| WO | WO2012083264 A2 | 6/2012 |
| WO | WO2012097015 A2 | 7/2012 |
| WO | 2013070391 | 5/2013 |
| WO | 2013081952 | 6/2013 |
| WO | 2013096019 | 6/2013 |
| WO | 2013112492 | 8/2013 |
| WO | WO2013189024 A1 | 12/2013 |
| WO | WO2014031046 A1 | 2/2014 |
| WO | 2014052099 | 4/2014 |
| WO | 2014088741 | 6/2014 |
| WO | 2014093829 | 6/2014 |
| WO | WO2014138483 | 9/2014 |
| WO | WO2014144837 | 9/2014 |
| WO | WO2014179753 | 11/2014 |
| WO | WO2015153020 A1 | 10/2015 |

OTHER PUBLICATIONS

"tcp—TCP Protocol", Linux Programmer's Manual, accessed Apr. 13, 2016 at URL: <<https://www.freebsd.org/cgi/man.cgi?query=tcp&apropos=0&sektion=7&manpath=SuSE+Linux%2Fi386+11.0&format=asci>>, Nov. 25, 2007, 11 pages.

Cardellini et al., "Dynamic Load Balancing on Web-server Systems", IEEE Internet Computing, vol. 3, No. 3, pp. 28-39, May-Jun. 1999.

Hunt et al. NetDispatcher: A TCP Connection Router, IBM Research Report RC 20853 May 19, 1997.

Spatscheck et al., "Optimizing TCP Forwarder Performance", IEEE/ACM Transactions on Networking, vol. 8, No. 2, Apr. 2000.

Kjaer et al. "Resource allocation and disturbance rejection in web servers using SLAs and virtualized servers", IEEE Transactions on Network and Service Management, IEEE, US, vol. 6, No. 4, Dec. 1, 2009.

Sharifian et al. "An approximation-based load-balancing algorithm with admission control for cluster web servers with dynamic workloads", The Journal of Supercomputing, Kluwer Academic Publishers, BO, vol. 53, No. 3, Jul. 3, 2009.

Koike et al., "Transport Middleware for Network-Based Control," IEICE Technical Report, Jun. 22, 2000, vol. 100, No. 53, pp. 13-18.

Yamamoto et al., "Performance Evaluation of Window Size in Proxy-based TCP for Multi-hop Wireless Networks," IPSJ SIG Technical Reports, May 15, 2008, vol. 2008, No. 44, pp. 109-114.

Abe et al., "Adaptive Split Connection Schemes in Advanced Relay Nodes," IEICE Technical Report, Feb. 22, 2010, vol. 109, No. 438, pp. 25-30.

* cited by examiner

GRACEFUL SCALING IN SOFTWARE DRIVEN NETWORKS

CROSS-REFERENCE TO RELATED APPLICATIONS

This application is a Continuation-in-Part of U.S. patent application Ser. No. 14/029,656, titled "Load Distribution in Data Networks," filed Sep. 17, 2013, which claims the priority benefit of U.S. provisional patent application No. 61/705,618, filed Sep. 25, 2012. The disclosures of the above referenced patent applications are incorporated herein by reference for all purposes.

TECHNICAL FIELD

This disclosure relates generally to data processing and, more specifically, to methods and system for scaling data networks.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

In a typical load balancing scenario, a service hosted by a group of servers is front-ended by a load balancer (LB) (also referred to herein as a LB device) which represents this service to clients as a virtual service. Clients needing the service can address their packets to the virtual service using a virtual Internet Protocol (IP) address and a virtual port. The LB will inspect incoming packets and, based on the policies/algorithms, will choose a particular server from the group of servers, modify the packet if needed, and forward the packet towards the server. On the way back from the server (optional), the LB will get the packet, modify the packet if needed, and forward the packet back towards the client.

The traditional approach for load balancing of network of servers has several drawbacks. For example, the network request load may stay lower than a maximum capacity of a LB device for a long time, which could lead to wasted resources. In another situation, a network request might exceed the maximum capacity a single LB device can handle. Generally speaking, the limitations of traditional load balancing of networks are due to there only being one or several static devices responsible for deciding how and where to send packets, which does not allow for dynamic changes in network configuration when one needs to scale down or scale up the resources.

Therefore more efficient methods and systems for scaling data networks may be needed.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for scaling in a data network (for example, a software driven network (SDN)). Specifically, a method for scaling in a data network may comprise receiving an indication of removing a first node from a plurality of nodes of the data network, generating a service policy, and sending the service policy to each of the plurality of nodes of the data network. The service policy reassigns service requests associated with the first node to a second node from the plurality of nodes of the data network. The first node is removed from the data network and the second node remains in the data network. The service policy can include a classification traffic map, wherein classes of service requests are assigned to nodes from the plurality of nodes of the data network.

In some embodiments, the method for scaling in a data network may include additional steps preventing interruption of heavy-duty connections served by the first node. For instance, before sending the service policy to each of the plurality of nodes of the data network, an indication of a presence of old connections associated with the first node can be received, and a redirection node can be created in a data network. A redirection policy can then be generated. The redirection policy contains an indication that service requests associated with the old connections should be sent from the second node via the redirection node to the first node. The redirection policy is sent to the second node and the redirection node. After sending the service policy to each of the plurality of nodes of the data network, the method for scaling in a data network can include waiting for an indication of finishing the old connection. Upon receiving the indication, the redirection policy is removed from the second node and the redirection node is removed from the data network.

In some embodiments, a method for scaling out a data network may comprise receiving an indication of a presence of a further node in the data network, generating a further node service policy, and sending the further node service policy to each of a plurality of nodes of the data network and to the further node. The further node service policy reassigns one or more of the service requests associated with any of the plurality of nodes of the data network to the further node.

In some embodiments, the method for scaling out a data network includes additional steps preventing interruption of heavy-duty connections served by one or more old nodes in plurality of the nodes of the data network. For example, before sending the further node service policy to each of the plurality of nodes of the data network, the method may include receiving an indication of a presence of old connections associated with an old node from the plurality of nodes of the data network. A redirection node can be created in the data network, and a redirection policy can be generated. The redirection policy indicates that service requests associated with the old connections should be sent from the further node via the redirection node to the old node. The redirection policy is sent to the redirection node and to the further node. After sending the further node service policy to each of the plurality of nodes of the data network and to the further node, the method may include waiting for an indication of finishing the old connections. Upon receiving the indication of finishing the old connections, the redirection policy is removed from the further node and the redirection node is removed from the data network.

According to another example embodiment, there is provided a system for scaling a data network. The system includes a cluster master and a plurality of nodes of a data network. The cluster master is configured to retrieve and analyze network data associated with the data network and service node data associated with one or more service nodes. The data network may be scaled in. For example, the cluster master can receive an indication of removing a first node from the plurality of nodes of the data network, generate a service policy, and send the service policy to each of the plurality of nodes of the data network. The service policy reassigns service requests associated with the first node to a second node from the plurality of nodes of the data network.

In other embodiments, the data network may be scaled out. For example, the cluster master can receive an indication of presence of a further node in the data network, generate a further node service policy, and send the further node service policy to each of the plurality of nodes of the data network and to the further node. The further node service policy reassigns one or more of the service requests associated with any of existing nodes of the plurality of nodes of the data network to the further node. In certain embodiments, the cluster master can be configured to carry out additional steps preventing interruption of heavy-duty connections served by the first node when the data network is scaled in or by one of the existing nodes when the data network scaled out.

In further example embodiments of the present disclosure, the steps of a method for scaling a data networks are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed.

The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The present disclosure relates to scaling in a data network, such as an SDN. The techniques of the embodiments disclosed herein may be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

According to an example embodiment, the method for graceful scaling a data network comprises receiving an indication of removing a first node from a plurality of nodes of the data network, generating a service policy, sending the service policy to each of the plurality of nodes of the data network, wherein the service policy reassigns service requests associated with the first node to a second node from the plurality of nodes of the data network. In some embodiments, the method for graceful scaling a data network comprises receiving an indication of a presence of a further node in the data network, generating a further service policy, and sending the further service policy to each of the plurality of nodes of the data network and to the further node, wherein the further service policy reassigns one or more of the service requests associated with any of the plurality of nodes of the data network to the further node.

Figure 1:
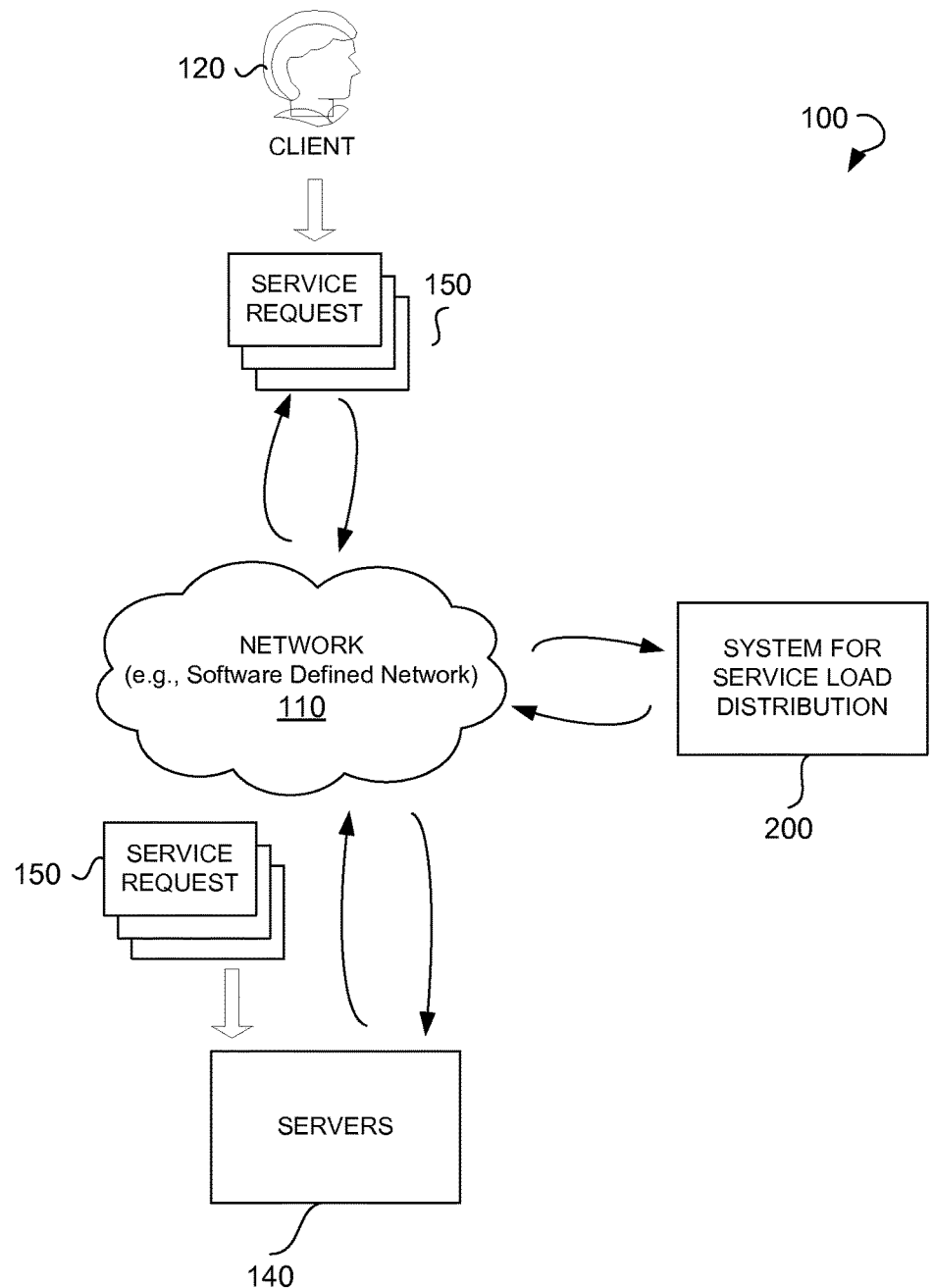
FIG. 1 shows an environment within which a method and a system for service load distribution in a data network can be implemented, according to an example embodiment.

Referring now to the drawings, FIG. 1 illustrates an environment 100 within which a method and a system for load distribution in an SDN can be implemented. The environment 100 includes a network 110, a client 120, a system 200 for load distribution, and servers 140. The client 120 includes a user or a host associated with the network 110.

The network 110 includes the Internet or any other network capable of communicating data between devices. Suitable networks include an interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may include a network of data processing nodes that are interconnected for the purpose of data communication. The network 110 includes an SDN. The SDN includes one or more of the above network types. Generally the network 110 includes a number of similar or dissimilar devices connected together by a transport medium enabling communication between the devices by using a predefined protocol. Those skilled in the art will recognize that the present disclosure can be practiced within a variety of network configuration environments and on a variety of computing devices.

As shown in FIG. 1, the client 120 sends service requests 150 to backend servers 140. The service requests 150 include an HTTP request, a video streaming request, a file download request, a transaction request, a conference request, and so forth. The servers 140 include a web server, a wireless application server, an interactive television server, and so forth. The system 200 for load distribution balance flow of the service requests 150 among traffic forwarding devices of the network 110. The system 200 for load distribution may analyze the flow of the service requests 150 and determine which and how many traffic forwarding devices of the network 110 are needed to deliver the service requests 150 to the servers 140.

Figure 2:
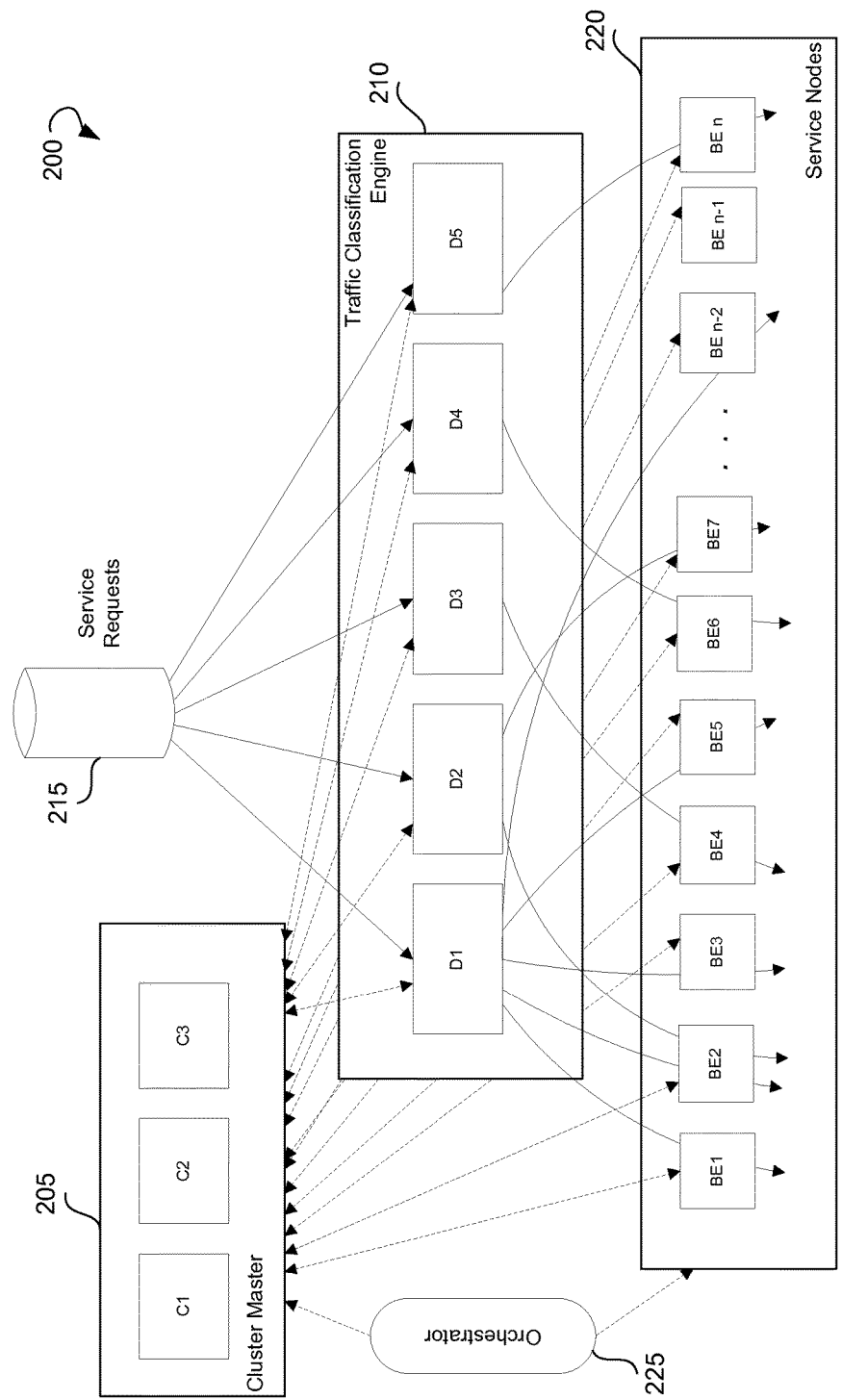
FIG. 2 is a block diagram showing various modules of a system for service load distribution in a data network.

FIG. 2 shows a block diagram illustrating various modules of a system 200 for service load distribution in an SDN, according to an example embodiment. The system 200 includes a cluster of devices eligible as a cluster master. The system 200 includes a cluster master 205 elected from these devices. The cluster master 205 is configured to keep track of the SDN and retrieve network data associated with the SDN. In an example embodiment, the network data include one or more of the following: a number of total connections, processing unit utilization, a memory status, a network connectivity, backend server capacity, and so forth. Furthermore, the cluster master 205 is configured to keep track of the service nodes and retrieve service node data associated with one or more service nodes. The service node data include one or more of the following: health, dynamic state, responsiveness of the one or more service nodes, and so forth. In other words, the cluster master 205 keeps track of the health of the network and each service node associated with the system 200. The cluster master 205 may analyze the retrieved network data and service node data. Based on the analysis, the cluster master 205 generates a service policy. The service policy includes a service address, a service node address, a service node load policy, a traffic distribution policy (also referred to as a traffic mapping), and so forth. The cluster master 205 may provide the generated service policy to the devices associated with the data network, such as service nodes and traffic classification engines.

In an example embodiment, the cluster master 205 is further configured to develop, based on the analysis, a further service policy. The further policy is associated with scaling out; scaling down; remedying; removing devices, such as service nodes, traffic classification engines, backend servers and so forth; and introducing new service nodes, traffic classification engines, backend servers, and so forth.

In an example embodiment, the cluster master 205 is further configured to facilitate an application programmable interface (not shown) for a network administrator to enable the network administrator to develop, based on the analysis, a further service policy using the retrieved network data and service node data and analytics. This approach allows application developers to write directly to the network without having to manage or understand all the underlying complexities and subsystems that compose the network.

In a further example embodiment, the cluster master 205 may include a backup unit (not shown) configured to replace the cluster master in case of a failure of the cluster master 205.

The system 200 may comprise a traffic classification engine 210. The traffic classification engine 210 may be implemented as one or more software modules, hardware modules, or a combination of hardware and software. The traffic classification engine 210 may include an engine configured to monitor data flows and classify the data flows based on one or more attributes associated with the data flows (e.g., uniform resource locators (URLs), IP addresses, port numbers, and so forth). Each resulting data flow class can be specifically designed to implement a certain service for a client. In an example embodiment, the cluster master 205 may send a service policy to the traffic classification engine 210. The traffic classification engine 210 may be configured to receive the service policy from the cluster master 205. Furthermore, the traffic classification engine 210 may be configured to receive one or more incoming service requests 215 (e.g. incoming data traffic from routers or switches (not shown)). Typically, the data traffic may be distributed from the routers or switches to each of the traffic classification engines 210 evenly. In an example embodiment, a router performs a simple equal-cost multi-path (ECMP) routing to distribute the traffic equally to all the traffic classification engines 210. The traffic classification engines 210 distribute the one or more service requests among one or more service nodes 220 according to the service policy. The traffic is distributed to the one or more service nodes 220 in an asymmetric fashion. The traffic to the service nodes 220 may be direct or through a tunnel (IP-in-IP or other overlay techniques). The traffic classification engine 210 may be stateless or stateful, may act on a per packet basis, and may direct each packet of the traffic to the corresponding service node 220. When there is a change in the state of the service nodes, the cluster master 205 sends a new service policy, such as a new traffic map, to the traffic classification engine 210.

The system 200 may comprise the one or more service nodes 220. The one or more service nodes 220 may include a virtual machine or a physical device that may serve a corresponding virtual service to which the traffic is directed. The cluster master 205 sends the service policy to the service nodes 220. The service nodes 220 may be configured to receive the service policy from the cluster master 205. Furthermore, the service nodes 220 receive, based on the service policy, the one or more service requests 215 from the traffic classification engine 210. The one or more service nodes 220 may process the received one or more service requests 215 according to the service policy. The processing of the one or more service requests 215 may include forwarding the one or more service requests 215 to one or more backend destination servers (not shown). Each service node 220 may serve one or more virtual services. The service nodes 220 may be configured to send the service node data to the cluster master 205.

According to further example embodiments, an existing service node may redirect packets for existing flows to another service node if it is the new owner of the flow based on the redistribution of flows to the service nodes. In addition, a service node taking over the flow may redirect packets to the service node that was the old owner for the flows under consideration, for cases where the flow state needs to be pinned down to the old owner to maintain continuity of service.

Furthermore, in an example embodiment, the cluster master 205 may perform a periodic health check on the service nodes 220 and update the service nodes 220 with a service policy, such as a traffic map. When there is a change in the traffic assignment and a packet of the data traffic in a flow reaches a service node 220, the service node 220 may redirect the packet to another service node. Redirection may be direct or through a tunnel (e.g., IP-in-IP or other overlay techniques).

It should be noted that if each of the devices of the cluster in the network performs the backend server health check, it may lead to a large number of health check packets sent to an individual device. In view of this, a few devices of the cluster may perform the backend server health check, and the result may be shared among the rest of the devices in the cluster. The health check may include a service check and a connectivity check. The service check may include determining whether the application or the backend server is still available. As already mentioned above, not every device in the cluster needs to perform this check. The check can be performed by a few devices, and the result propagated to the rest of the devices in the cluster. A connectivity check includes determining whether the service node can reach the backend server. The path to the backend server may be specific to the service node, so this may not be distributed across service nodes, and each device in the cluster may perform its own check.

In an example embodiment, the system 200 comprises an orchestrator 225. The orchestrator 225 may be configured to bring up and bring down the service nodes 220, the traffic classification engines 210, and backend servers. The orchestrator 225 may detect a presence of the one or more service nodes 220 and transmit data associated with the presence of the one or more service nodes 220 to the cluster master 205. Furthermore, the orchestrator 225 may inform the cluster master 205 of bringing up or bringing down the service nodes 220. The orchestrator 225 may communicate with the cluster master 205 and the service nodes 220 using one or more Application Programming Interfaces (APIs).

In an example embodiment, a centralized or distributed network database may be used and shared among all devices in the cluster of the system 200, such as the cluster master, the traffic classification engine, and other service nodes. Each device may connect to the network database and update tables according to its role. Relevant database records may be replicated to the devices that are part of the cluster. The distributed network database may be used to store configurations and states of the devices (e.g., to store data associated with the cluster master, the traffic classification engine, the one or more service nodes, and backend servers). The data stored in the distributed network database may include the network data and the service node data. The distributed network database may include tables with information concerning service types, availability of resources, traffic classification, network maps, and so forth. The cluster master 205 may be responsible for maintaining the distributed network database and replicating it to devices. The network database may be replicated to the traffic classification engines 210 and the service nodes 220. In an example embodiment, the network database may internally replicate data across the participant nodes.

In the embodiments described above, the system 200 comprises a dedicated cluster master 205, dedicated traffic classification engines 210, and dedicated service nodes 220. In other words, specific devices can be responsible for acting as the cluster master, the traffic classification engine, and the service node. In further example embodiments, the system 200 includes no dedicated devices acting as a cluster master. In this case, the cluster master functionality is provided by either the traffic classification engines or by the service nodes. Thus, one of the traffic classification engines or one of the service nodes is operable to act as the cluster master. In case the traffic classification engine or service node acting as the cluster master fails, another traffic classification engine or service node may be elected as the cluster master. The traffic classification engines and the service nodes not elected as the cluster master are configured as backup cluster masters and synchronized with the current cluster master. In an example embodiment, the cluster master consists of multiple active devices that can act as a single master by sharing duties among the devices.

In further example embodiments, the system 200 comprises a dedicated cluster master with no dedicated devices acting as traffic classification engines. In this case, the traffic classification may be performed by one of upstream routers or switches. Also, the service nodes may distribute the traffic among themselves. In an example embodiment, the cluster master and the service nodes are configured to act as a traffic classification engine.

In further example embodiments, the system 200 includes no devices acting as cluster masters and traffic classification engines. In this case, one of the service nodes is configured to also act as the cluster master. Upstream routers or switches can do the traffic classification. The cluster master programs the upstream routers with the traffic mapping. Additionally, the service nodes distribute the traffic among themselves.

It should be noted that bringing up new service nodes when the load increases and bringing down the service nodes when the load becomes normal can be performed gracefully, without affecting existing data traffic and connections. When the service node comes up, the distribution of traffic changes from distribution to n service nodes to distribution to (n+1) service nodes.

When a service node is about to be brought down, the traffic coming to this service node is redirected to other service nodes. For this purpose, a redirection policy associated with the service node about to be brought down may be created by the cluster muster and sent to the traffic distribution engine and/or the service nodes. Upon receiving the redirection policy, the traffic distribution engine directs the traffic to another service node.

In an example embodiment, the system 200 comprises, for example, a plurality of traffic distribution engines, each of which serves traffic to multiple services. Each of the traffic distribution engines may communicate with a different set of service nodes. In case one of the traffic distribution engines fails, another traffic distribution engine is configured to substitute the failed traffic distribution engine and to distribute the traffic of the failed traffic distribution engine to the corresponding service nodes. Therefore, each of the traffic distribution engines comprises addresses of all service nodes and not only addresses associated with the service nodes currently in communication with the traffic distribution engine.

Figure 3:
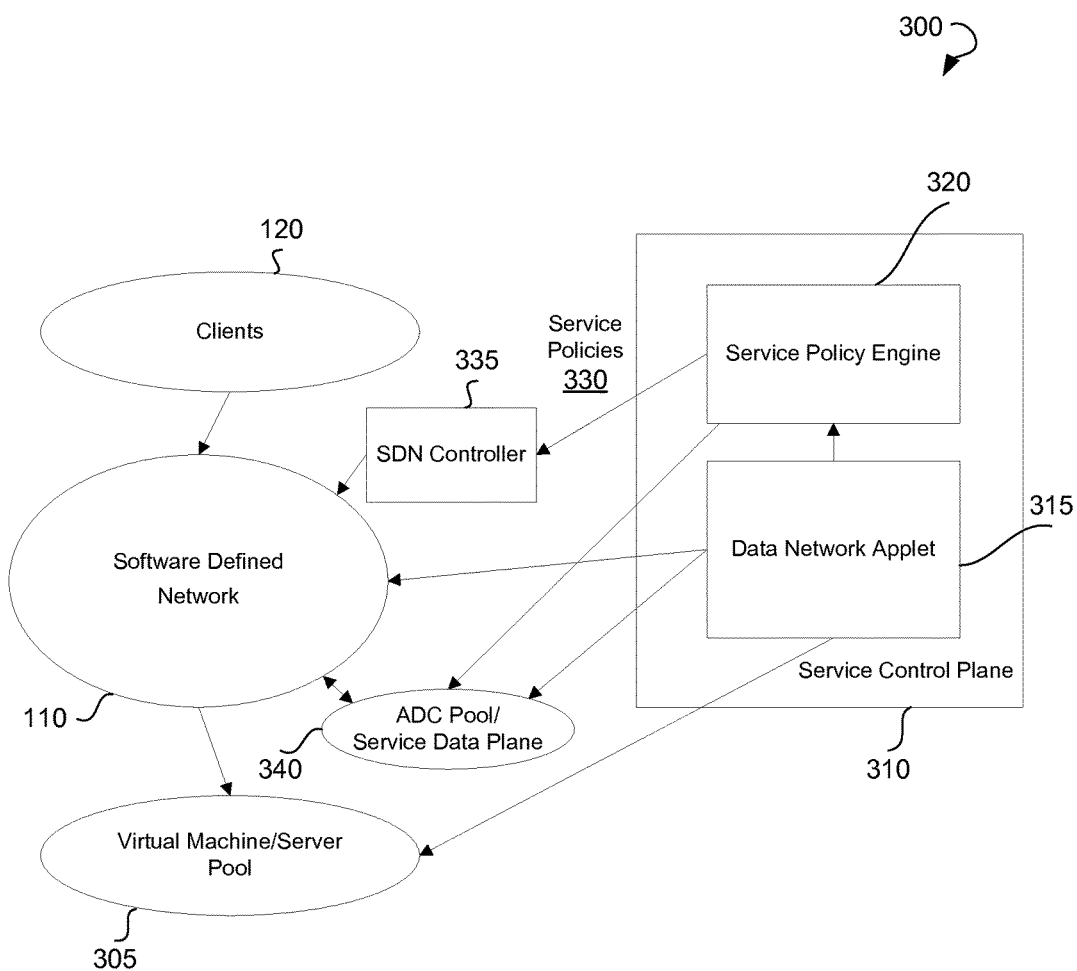
FIG. 3 is a scheme for service load distribution of a data network.

FIG. 3 shows a block diagram 300 for load distribution of an SDN, according to an example embodiment. As shown, diagram 300 includes clients 120 (e.g., a computer connected to a network 110). The network 110 may include the SDN. The clients 120 may send one or more service requests for services provided by one or more servers of a virtual machine/server pool 305. These servers include web servers, wireless application servers, interactive television servers, and so forth. These service requests can be load balanced by a system for load distribution described above. In other words, the service requests of the clients 120 may be intelligently distributed among virtual machine/server pool 305 of the SDN.

The system for load distribution includes a service control plane 310. The service control plane 310 includes one or more data network applets 315 (for example, a real time data network applet). The data network applets 315 check the health and other data associated with the SDN 110 and the virtual machines 305. For example, the data network applets 315 may determine responsiveness of the virtual machine/server pool 305. Furthermore, the data network applets 315 monitor the total connections, central processing unit utilization, memory, network connectivity on the virtual machine/server pool 305, and so forth. Therefore, the data network applets 315 may retrieve fine-grained, comprehensive information concerning the SDN and virtual machine service infrastructure.

The retrieved health data may be transmitted to a service policy engine 320. In example embodiments, a cluster master 205 described above may act as the service policy engine 320. The service policy engine 320 may analyze the health data and, upon the analysis, generate a set of service policies 330 to scale up/down the services, to secure services, to introduce new services, to remove services, to remedy or repair failed devices, and so forth. The system for load distribution may further comprise an orchestrator (not shown) configured to bring up more virtual machines on demand. Therefore, in order to deliver a smooth client experience, the service requests may be load balanced across the virtual machine/server pool 305.

Furthermore, service policies 330 may be provided to an SDN controller 335. The SDN controller 335, in turn, may steer service requests, i.e., data traffic, across the network devices in the SDN. Effectively, these policies may control load balancing, availability, and functionality of the SDN network to scale up or scale down services.

Generally speaking, by unlocking the data associated with the network, service nodes, and the server/virtual machines from inside the network, transforming the data into relevant information and the service policies 330, and then presenting the service policies 330 to the SDN controller 335 for configuring the SDN 110, the described infrastructure may enable feedback loops between underlying infrastructure and applications to improve network optimization and application responsiveness.

The service control plane 310 working in conjunction with the controller 335 and the service policy engine 320 may create a number of deployment possibilities, which may offer an array of basic and advanced load distribution features. In particular, to provide a simple load balancing functionality, the SDN controller 335 and the service control plane 310 may provide some load balancing of their own by leveraging the capabilities of the SDN 110 or, alternatively, work in conjunction with an ADC 340, also referred to as a service data plane included in the SDN 110 to optionally provide advanced additional functionality.

In an example embodiment, the service control plane 310 may be standalone, i.e., without an ADC 340, virtual machines 305 or, when scaled up, may be programmed with a virtual Internet Protocol (VIP) address on a loopback interface of the virtual machines 305. Thus, for data traffic in need of simple service fulfillment, the service control plane 310 may establish simple policies for distributing service requests and instruct the SDN controller 335 to program network devices to distribute the service requests directly to different virtual machines/physical servers 305. This step may be performed over a physical or logical network.

In an example embodiment, while the service control plane 310 may work in cooperation with an ADC 340, the service control plane 310 may manage a set of service policy mapping service requests to one or more ADC devices for more sophisticated ADC functionality typically offered by a purpose built ADC device. The service control plane 310 may instruct the SDN controller 335 to program network devices such that the service requests, i.e., the traffic, may reach one or more ADCs 340. The ADC 340 then may relay the service request to a backend server over a physical or logical network.

In the described embodiment, several traffic flow scenarios may exist. In an example embodiment, only forward traffic may go through the ADC 340. If a simple functionality of the ADC 340 (e.g., rate limiting, bandwidth limiting, scripting policies) is needed, the forward traffic may traverse the ADC 340. The loopback interface on the servers may be programmed with the VIP address. Response traffic from the virtual machines 305 may bypass the ADC 340.

In a further example embodiment, forward and reverse traffic may traverse the ADC 340. If it is needed that the ADC 340 provide a more advanced functionality (e.g., transmission control protocol (TCP) flow optimization, secure sockets layer (SSL) decryption, compression, caching and so forth), the service control plane 310 may need to ensure that both the forward and reverse traffic traverses through the ADC 340 by appropriately programming the SDN 110.

Figure 4:
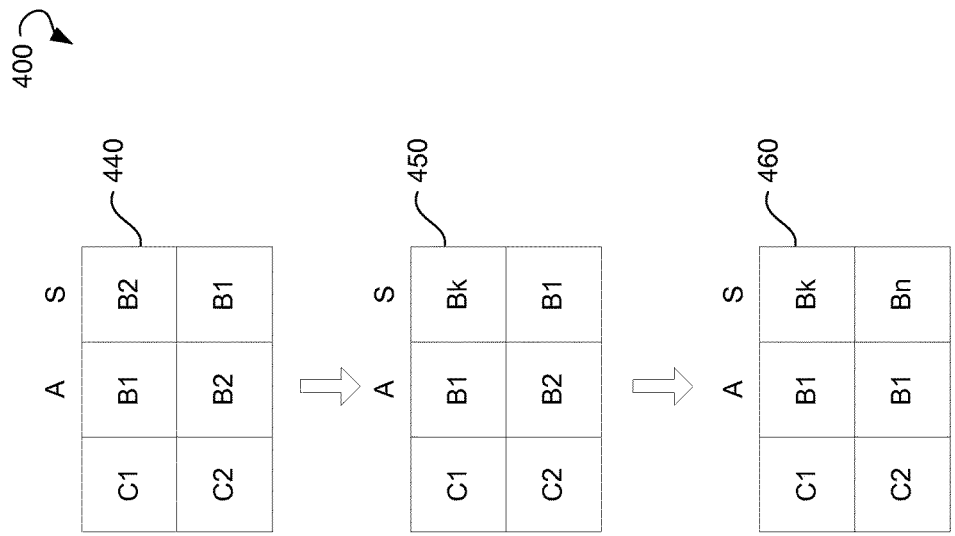
FIG. 4 is a scheme showing graceful scaling in a data network.

FIG. 4 is a scheme 400 showing graceful scaling in a data network, according to an example embodiment. In example scheme 400, two service nodes 420 (B1) and 425 (B2) receive data traffic from node 410 (D1) belonging to traffic classification engine 210 (shown in FIG. 2). The service node 425 is being removed from the data network. The node 410 sends the data traffic according to a service policy described in traffic map 440 generated by a cluster master 205 (shown in FIG. 2).

In the example traffic map 440, the column A contains "active" nodes and the column S contains the "stand by" nodes for service requests belonging to class C1 and C2. According to the traffic map 440, the all service requests belonging to class C1 are sent first to the node B1 and, if node B1 cannot handle the received service requests, to the node B2. Correspondingly, all service requests classified to class C2 are sent first to the node B2, and, if node B2 cannot handle the received packet, to the node B1.

In order to remove the service node B2, the cluster master 205 first generates new traffic map 450, wherein the node B2 is removed from the "stand by" column. Another service node from the data network, for example Bk, may be assigned as the "stand by" node for the packets belonging to class C1.

Further, the cluster master generates another traffic map 460, wherein the node B2 is replaced as "active" node by the "stand by" node for the corresponding class of the service requests. In example scheme 400, the B2 node is replaced by the B1 node. The cluster master sends the copy of the new traffic map 460 to the nodes of the traffic classification engine and service nodes of the data network. The B2 node can be safely removed or shutdown from the data network.

It should be noted that example scheme 400 for graceful scaling in a data network is suitable for removing nodes involved in connections with light traffic flow.

Figure 5:
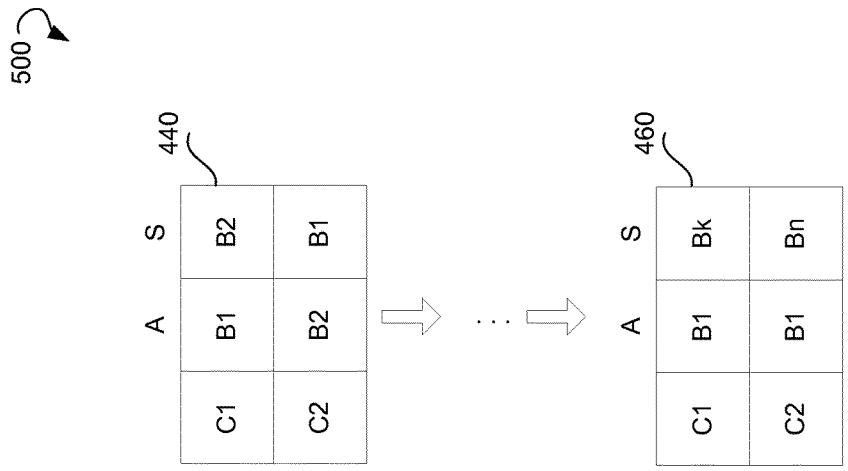
FIG. 5 is a scheme showing graceful scaling in a data network.
Figure 5:
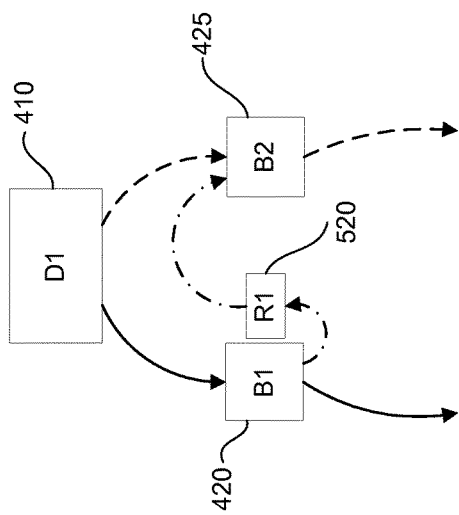

FIG. 5 is a scheme 500 showing graceful scaling in a data network, according to another example embodiment. The example scheme 500 is suitable for removing nodes involved in heavy duty traffic connections (for example, SSL (Secure Sockets Layer) type connections.)

In example scheme 500, two service nodes 420 (B1) and 425 (B2) receive data traffic from node 410 (D1) belonging to traffic classification engine 210 (shown in FIG. 2). The node 410 sends the data traffic according to a service policy described in traffic map 440 generated by a cluster master 205 (shown in FIG. 2). The service node 425 is needed to be removed from the data network.

In order to remove the B2 node, the cluster master generates and sends to the traffic classification engine and service nodes new traffic map 460 as described in FIG. 4. Before generating and sending the new traffic map 460, an indication of a presence of and old connections associated with the B2 node is received, and a redirection node 520 (R1) is created. The cluster master 205 sends a redirection service policy to the nodes B1 and R1. According to the redirection service policy, all service requests belonging to the old connections should be sent from the node B1 through the redirection node R1 to the B2 node. All other service requests flow through the B1 node according to the new traffic map 460. After the cluster map receives an indication from the service node B2 that all old connections are finished, the redirection node R1 may be removed from data network and the redirection service policy can be cleared from the B1 node. The B2 service node can be safely removed from the data network.

Figure 6:
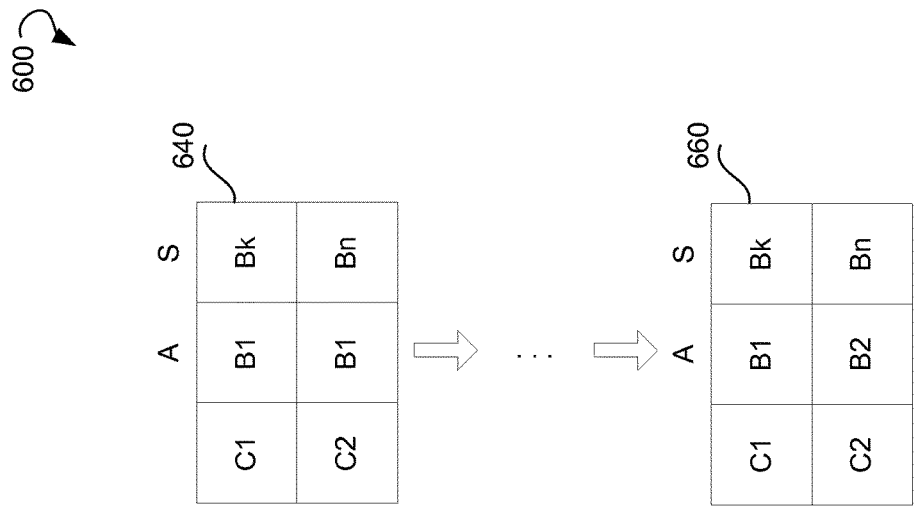
FIG. 6 is a scheme showing graceful scaling out a data network.
Figure 6:
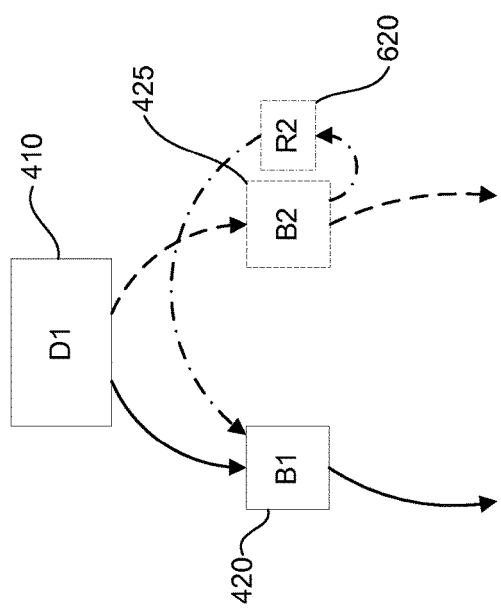

FIG. 6 is a scheme 600 showing graceful scaling out a data network, according to an example embodiment. In example scheme 600 the service node 420 (B1) receives data traffic from node 410 (D1) belonging to traffic classification engine 210 (shown in FIG. 2). The node 410 sends the data traffic according to a service policy described in traffic map 640 generated by a cluster master 205 (shown in FIG. 2). The service node 425 (B2) is added to the data network.

In the example traffic map 640, the column A contains "active" nodes and the column S contains the "stand by" nodes for service requests belonging to class C1 and C2. According to the traffic map 640, all service requests belonging to classes C1 and C2 are send first to the node B1 and, if node B1 cannot handle the received service requests, then the packets of class C1 are sent to the node Bk and the packets of class C2 are sent to node Bn.

After service node B2 becomes active in the data network, the cluster master may generate new traffic map 660. According to new traffic map 660, all service requests classified to class C2 should be sent to the node B2. The cluster master sends the new traffic map to nodes of traffic classification engine and all service nodes in the data network.

If the service node B1 was handling a heavy traffic connection before adding new node B2, such as a SSL connection, then before the cluster master generates and sends the new traffic map 660, a redirection node 620 (R2) can be created. The cluster master sends a redirection service policy to the node B2 and R2. According to the redirection service policy, all service requests belonging to old connections that flowed through the B1 node before generating the new traffic map 460 should be sent from the B2 node through the redirection node R2 to the B1 node. All other service requests flow through the B2 node according to the service policy described in the new traffic map 460. After the cluster map receives an indication from the service node B1 that all old connections are finished, the redirection node R2 may be removed from data network and the redirection service policy can be cleared from the B2 node.

Figure 7:
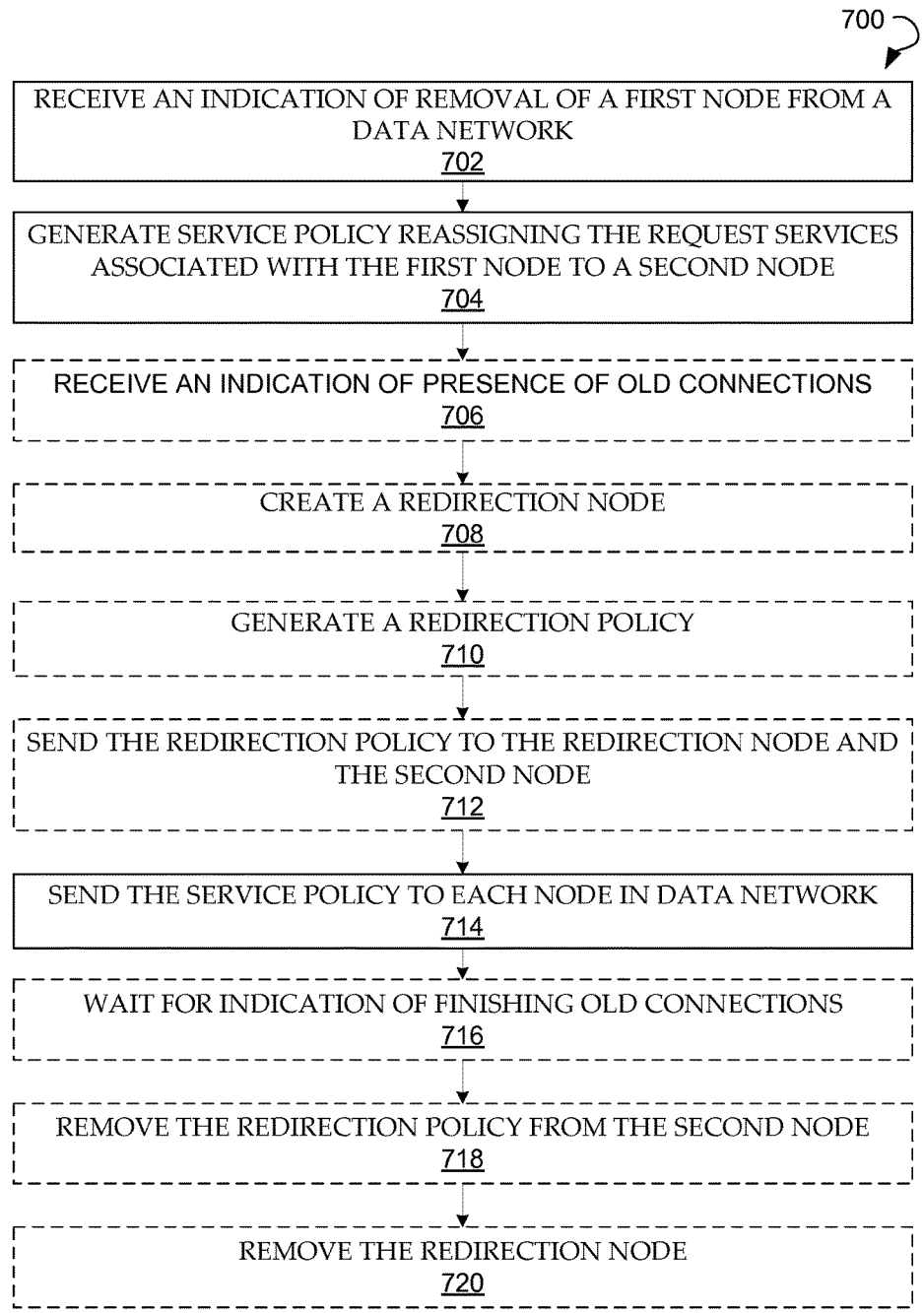
FIG. 7 is a process flow diagram showing a method for graceful scaling in a data network.

FIG. 7 is a process flow diagram showing a method 700 for graceful scaling in a data network, according to an example embodiment. The method 700 can be performed by processing logic that may comprise hardware (e.g., decision making logic, dedicated logic, programmable logic, and microcode), software (such as software running on a general-purpose computer system or a dedicated machine), or a combination of both. In particular, the method 700 can be implemented in example SDN shown in FIG. 2.

The method 700 may commence in step 702 with receiving an indication of removing a node from a plurality of nodes in a data network. In step 704, the method 700 proceeds further with generation of a service policy, and the service policy reassigns service requests associated with the first node to a second node from the plurality of nodes in the data network.

The method 700 may proceed further with following optional steps 706-712. In optional step 706, the method 700 continues with receiving an indication of a presence of old connections associated with the first node. In step 708, a redirection node is created in data network. In step 710, a redirection policy is generated. The redirection policy contains an indication that service requests belonging to old connections should be sent from the second node via the redirection node to the first node. In step 712, the redirection policy is sent to the second node and the redirection node.

In step 714, the service policy generated in step 704 is sent to each node in the plurality of nodes in the data network. The method 700 can further proceed with following optional steps 716-720. In optional 716, the method 700 proceeds with waiting for an indication that all old connections in the first node are finished. In step 718, the redirection policy is removed from the second node. In step 720, the redirection node is removed from the data network.

Figure 8:
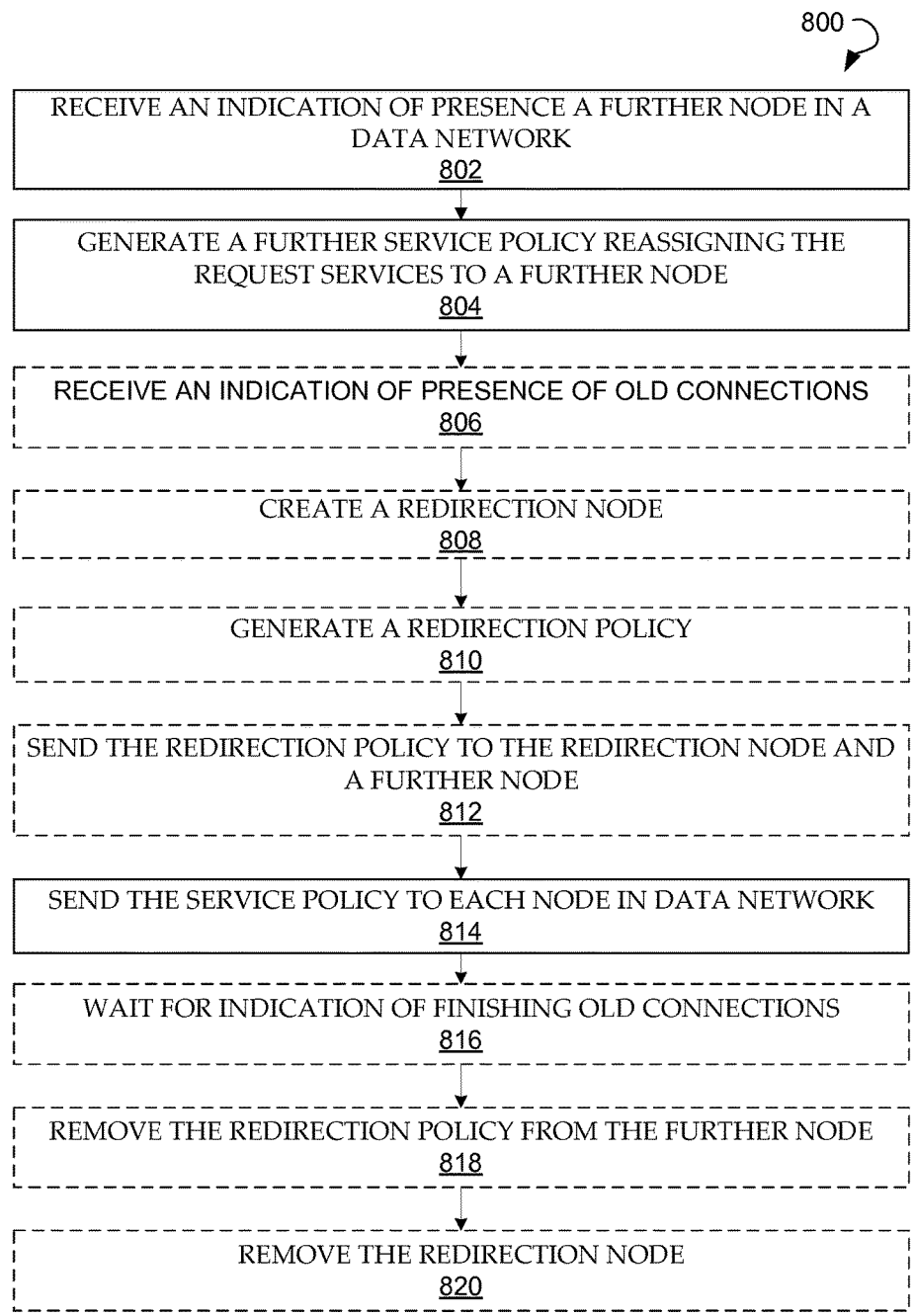
FIG. 8 is a process flow diagram showing a method for graceful scaling out a data network.

FIG. 8 is a process flow diagram showing a method 800 for graceful scaling out a data network, according to an example embodiment. The method 800 can be performed by processing logic that may comprise hardware (e.g., decision making logic, dedicated logic, programmable logic, and microcode), software (such as software running on a general-purpose computer system or a dedicated machine), or a combination of both. In particular, the method 800 can be implemented in example SDN shown in FIG. 2.

The method 800 may commence in step 802 with receiving an indication of a presence of a further node in a plurality of nodes of a data network. In step 804, a further node policy is generated. The further node policy reassigns to the further node one or more service requests associated earlier with any of plurality of nodes of the data network.

The method 800 may further proceed with optional steps 806-812. In optional step 806, the method 800 may proceed with receiving an indication of old connections associated with an old node of the plurality of the nodes of the data network. In step 808, a redirection node can be created in data network. In step 810, a redirection policy is generated. The redirection policy indicates that service requests associated with old connections should be sent to the further node via the redirection node to the old node. In step 812, the redirection policy is sent to the redirection node and to the further node.

In step 814, the further node policy is sent to all nodes in the plurality of nodes of the data network and to the further node.

The method 800 may further proceed with optional steps 816-820. In step 816, the method 800 continues with waiting for an indication that all old connections are finished. In step 818, the redirection policy is removed from the further node. In step 820, the redirection node is removed from the data network.

Figure 9:
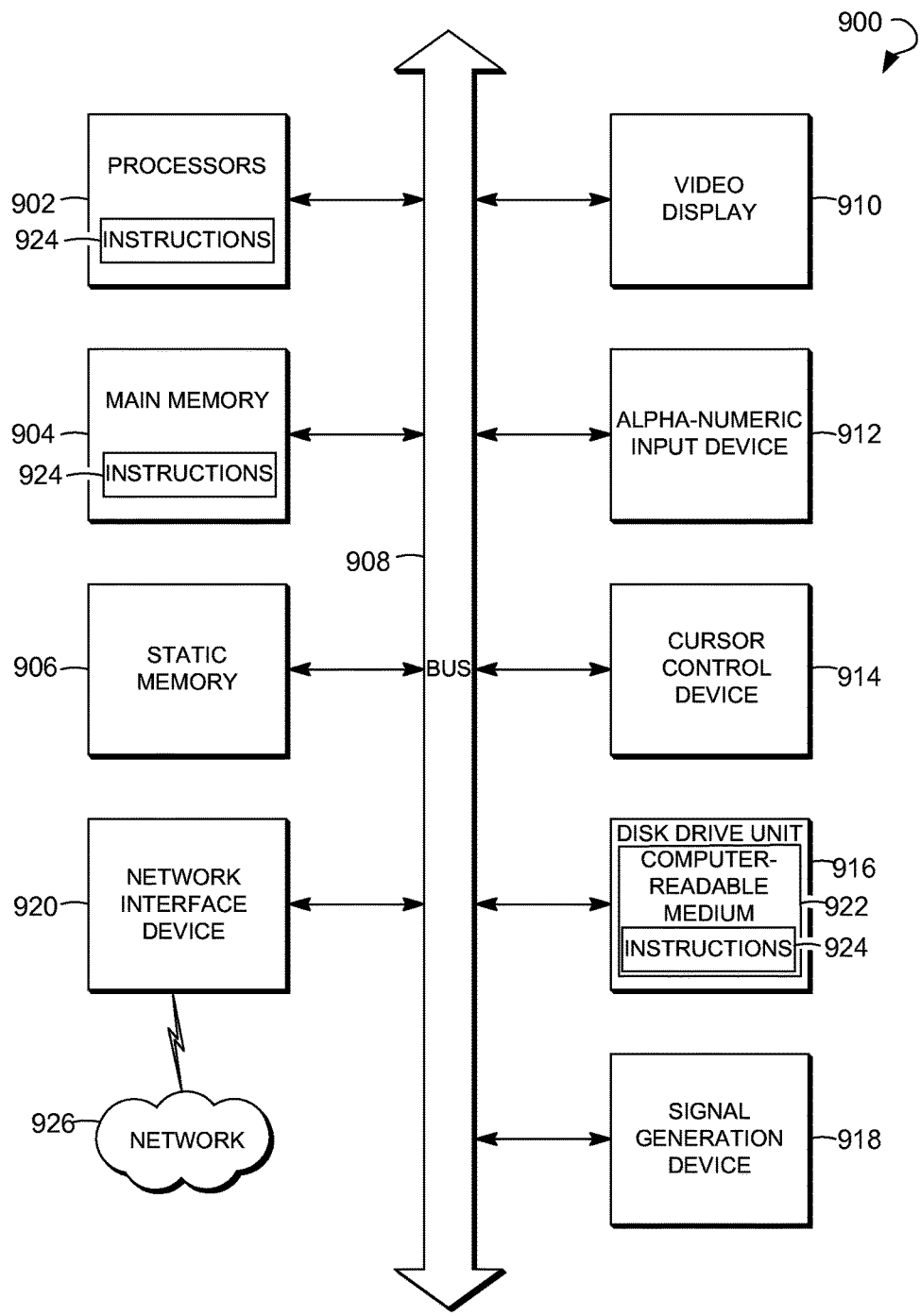
FIG. 9 shows a diagrammatic representation of a computing device for a machine in the example electronic form of a computer system, within which a set of instructions for causing the machine to perform any one or more of the methodologies discussed herein, can be executed.

FIG. 9 shows a diagrammatic representation of a machine in the example electronic form of a computer system 900, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 may also include an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a non-transitory computer-readable medium 922, on which is stored one or more sets of instructions and data structures (e.g., instructions 924) embodying or utilized by any one or more of the methodologies or functions described herein. The instructions 924 may also reside, completely or at least partially, within the main memory 904 and/or within the processors 902 during execution thereof by the computer system 900. The main memory 904 and the processors 902 may also constitute machine-readable media.

The instructions 924 may further be transmitted or received over a network 926 via the network interface device 920 utilizing any one of a number of well-known transfer protocols (e.g., HTTP).

While the computer-readable medium 922 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for graceful scaling nodes in an SDN are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for graceful scaling of a data network by a cluster master, the method comprising:

receiving an indication of a removal of a first node from a plurality of nodes of the data network;

generating a service policy, the service policy being operable to reassign service requests associated with the first node to a second node selected from the plurality of nodes of the data network, wherein the reassigning the service requests associated with the first node includes redirecting all of the service requests associated with the first node to the second node, receiving an indication of presence of old connections, the old connections being associated with the first node, creating a redirection node in the data network, generating a redirection policy, the redirection policy indicating that service requests associated with the old connections are to be sent from the second node to the first node via the redirection node, and sending the redirection policy to the redirection node and the second node, and after sending the service policy to each of the plurality of nodes of the data network, waiting for an indication of finishing the old connections and upon receiving the indication of finishing the old connections, removing the redirection policy from the second node, and removing the redirection node from the data network;

sending the service policy to one or more of the plurality of nodes of the data network; and removing the first node from the data network upon completion of connections associated with the service requests associated with the first node.

2. The method of claim 1, wherein the plurality of nodes of the data network include at least one virtual machine and at least one physical device.

3. The method of claim 1, wherein the plurality of nodes include a plurality of cluster devices, the cluster master, a traffic classification engine, service nodes, and an orchestrator.

4. The method of claim 3, wherein the traffic classification engine distributes service requests processed by the data network to a service node in accordance with the service policy generated by the cluster master.

5. The method of claim 1, wherein the indication of removal of the first node is generated based on one or more of the following: first node health, a first node service policy, analysis of a first node data, and absence of the first node data.

6. The method of claim 5, wherein the first node data includes a number of total connections, destination server address, destination server capacity, and destination server network connectivity.

7. The method of claim 1, wherein the service policy includes a traffic map table, wherein classes of the service requests are assigned to nodes in the plurality of nodes of the data network.

8. The method of claim 7, wherein the classes of the service requests are obtained by classification of the service request based on one of the following: a source address of the service request and a destination address of the service request.

9. The method of claim 1, further comprising:
receiving an indication of presence of a further node in the data network;
generating a further node service policy, the further node service policy reassigning one or more of the service requests associated with any of the plurality of nodes of the data network to the further node; and
sending the further node service policy to each of the plurality of nodes of the data network and to the further node.

10. The method of claim 9, further comprising:
before sending the further node service policy to each of the plurality of nodes of the data network:
receiving an indication of presence of old connections, the old
connections being associated with an old node from the plurality of nodes of the data network;
creating a redirection node in the data network;
generating a redirection policy, the redirection policy indicating that
service requests associated with the old connections be sent from the further node via the redirection node to the old node; and
sending the redirection policy to the redirection node and the further
node; and
after sending the further node service policy to each of the plurality of nodes of the data network and to the further node:
waiting for an indication of finishing the old connections and upon receiving the indication of finishing the old connections:
removing the redirection policy from the further node; and removing
the redirection node from the data network.

11. A system for graceful scaling a data network, the system comprising:
a plurality of nodes; and
a cluster master including at least one node of the plurality of nodes, the cluster master operable to:
receive an indication of removing a first node from the plurality of nodes of the data network;
generate a service policy, the service policy reassigning any service requests associated with the first node to a second node from the plurality of nodes of the data network, wherein the reassigning the service requests associated with the first node includes redirecting all of the service requests associated with the first node to the second node, receiving an indication of presence of old connections, the old connections being associated with the first node, creating a redirection node in the data network, generating a redirection policy, the redirection policy indicating that service requests associated with the old connections are to be sent from the second node to the first node via the redirection node, and sending the redirection policy to the redirection node and the second node, and after sending the service policy to each of the plurality of nodes of the data network, waiting for an indication of finishing the old connections and upon receiving the indication of finishing the old connections, removing the redirection policy from the second node, and removing the redirection node from the data network;
send the service policy to one or more of the plurality of nodes of the data network; and
remove the first node from the data network upon completion of
connections associated with the service requests associated with the first node.

12. The system of claim 11, wherein the plurality of nodes of the data network include a virtual machine and a physical device.

13. The system of claim 11, wherein the plurality of nodes includes a plurality of cluster devices, a traffic classification engine, service nodes, and an orchestrator.

14. The system of claim 11, wherein the indication of removing of the first node is generated based on one or more of the following: a first node health, a first node service policy, an analysis of the first node data, and an absence of the first node data.

15. The system of claim 14, wherein the first node data includes a number of total connections, destination server address, destination server capacity, and destination server network connectivity.

16. The system of claim 11, wherein the service policy is a traffic map table, wherein classes of the services requests are assigned to nodes in the plurality of nodes of the data network.

17. The system of claim 16, wherein the classes of the service requests are obtained by classification of the service requests based on one of the following: a source address of the service request and a destination address of the service request.

18. The system of claim 11, wherein the cluster master is further operable to:
receive an indication of presence of a further node in the data network;
generate a further node service policy, the further node service policy reassigning one or more of the service requests associated with any of the plurality of nodes of the data network to the further node; and
send the further node service policy to each of the plurality of nodes of the data network and to the further node.

19. The system of claim 18, wherein:
before sending the further node service policy to each of the plurality of nodes of the data network, the cluster master is further operable to:
receive an indication of presence of old connections, the old connections being associated with an old node from the plurality of nodes of the data network;
generate an instruction to create a redirection node in the data network;
generate a redirection policy, the redirection policy indicating that service requests associated with the old connections be sent from the further node via the redirection node to the old node; and
send the redirection policy to the redirection node and the further node;
and after sending the further node service policy to each of the plurality of nodes of the data network and to the further node, the cluster master is further operable to:
wait for an indication of finishing the old connections and upon receiving the indication of finishing the old connections:
remove the redirection policy from the further node; and
generate an instruction to remove the redirection node from the data network.

20. A non-transitory computer-readable storage medium having embodied thereon a program, the program being executable by a processor to perform a method for graceful scaling of a data network by a cluster master, the method comprising:
receiving an indication of removing a first node from a plurality of nodes of the data network;
generating a service policy, the service policy reassigning any service requests associated with the first node to a second node from the plurality of nodes of the data network, wherein the reassigning the service requests associated with the first node includes redirecting all of the service requests associated with the first node to the second node, receiving an indication of presence of old connections, the old connections being associated with the first node, creating a redirection node in the data network, generating a redirection policy, the redirection policy indicating that service requests associated with the old connections are to be sent from the second node to the first node via the redirection node, and sending the redirection policy to the redirection node and the second node, and after sending the service policy to each of the plurality of nodes of the data network, waiting for an indication of finishing the old connections and upon receiving the indication of finishing the old connections, removing the redirection policy from the second node, and removing the redirection node from the data network;
sending the service policy to one or more of the plurality of nodes of the data network; and
removing the first node from the data network upon completion of connections associated with the service requests associated with the first node.

21. The non-transitory computer-readable storage medium of claim 20, wherein the method for graceful scaling the data network further comprises:
receiving an indication of presence of a further node in the data network;
generating a further node service policy, the further node service policy reassigning one or more of the service requests associated with any of the plurality of nodes of the data network to the further node; and
sending the further node service policy to each of the plurality of nodes of the data network and to the further node.

22. The non-transitory computer-readable storage medium of claim 21, wherein the method for graceful scaling the data network further comprises:
before sending the further node service policy to each of the plurality of nodes of the data network:
receiving an indication of presence of old connections, the old connections being associated with an old node from the plurality of nodes of the data network;
creating a redirection node in the data network;
generating a redirection policy, the redirection policy indicating that service requests associated with the old connections be sent from the further node via the redirection node to the old node; and
sending the redirection policy to the redirection node and the further
node; and
after sending the further node service policy to each of the plurality of nodes of the data network and to the further node:
waiting for an indication of finishing the old connections and upon receiving the indication of finishing the old connections:
removing the redirection policy from the further node; and
removing the redirection node from the data network.

* * * * *